United States Patent [19]

Ossian et al.

[11] Patent Number: 5,397,492

[45] Date of Patent: Mar. 14, 1995

[54] NON-OIL BASED SWEEPING COMPOUND

[75] Inventors: Kenneth C. Ossian, Blue Grass; Norbert J. Steinhauser, Dubuque, both of Iowa

[73] Assignee: Ossian, Inc., Davenport, Iowa

[21] Appl. No.: 73,127

[22] Filed: Jun. 7, 1993

[51] Int. Cl.$^6$ .............................................. C09K 3/22
[52] U.S. Cl. ..................................................... 252/88
[58] Field of Search ................................. 252/358, 88

[56] References Cited

U.S. PATENT DOCUMENTS

| | | | |
|---|---|---|---|
| 827,887 | 8/1906 | Singer | 252/88 |
| 944,276 | 12/1909 | Punch et al. | 252/88 |
| 3,632,514 | 1/1972 | Blocher | 252/88 |
| 3,657,135 | 4/1972 | Lewer | 252/88 |
| 3,681,246 | 8/1972 | Lewer | 252/88 |
| 3,692,861 | 10/1954 | Weeks | 252/88 |
| 3,928,222 | 12/1975 | Cheslick, Sr. | 252/88 |
| 4,001,033 | 1/1977 | Anthone et al. | 106/287.23 |

FOREIGN PATENT DOCUMENTS 17246 of 1906 United Kingdom .................. 252/88

*Primary Examiner*—Richard D. Lovering
*Attorney, Agent, or Firm*—Zarley, McKee, Thomte, Voorhees, & Sease

[57] ABSTRACT

A floor sweeping composition including a floor sweeping solid carrier and a liquid hygroscopic alkali or alkaline earth salt solution, preferably selected from the group of magnesium chloride and calcium chloride. The liquid enhances the effectiveness of the sweeping composition and its ability to collect and remove fine dust materials.

13 Claims, 1 Drawing Sheet

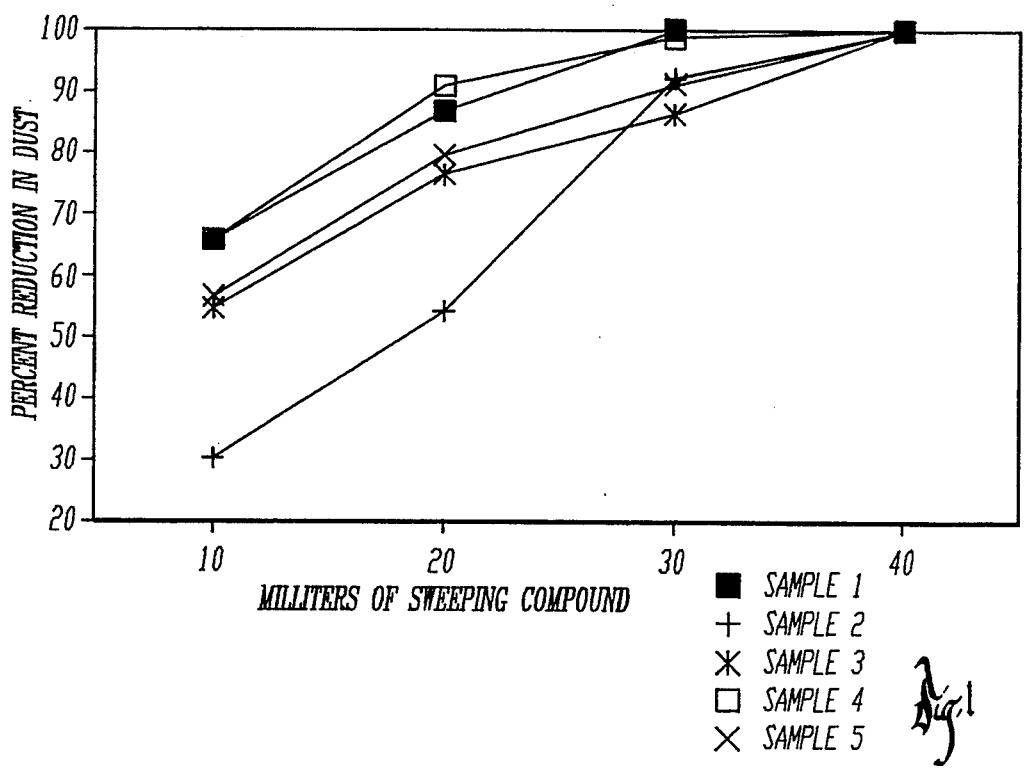
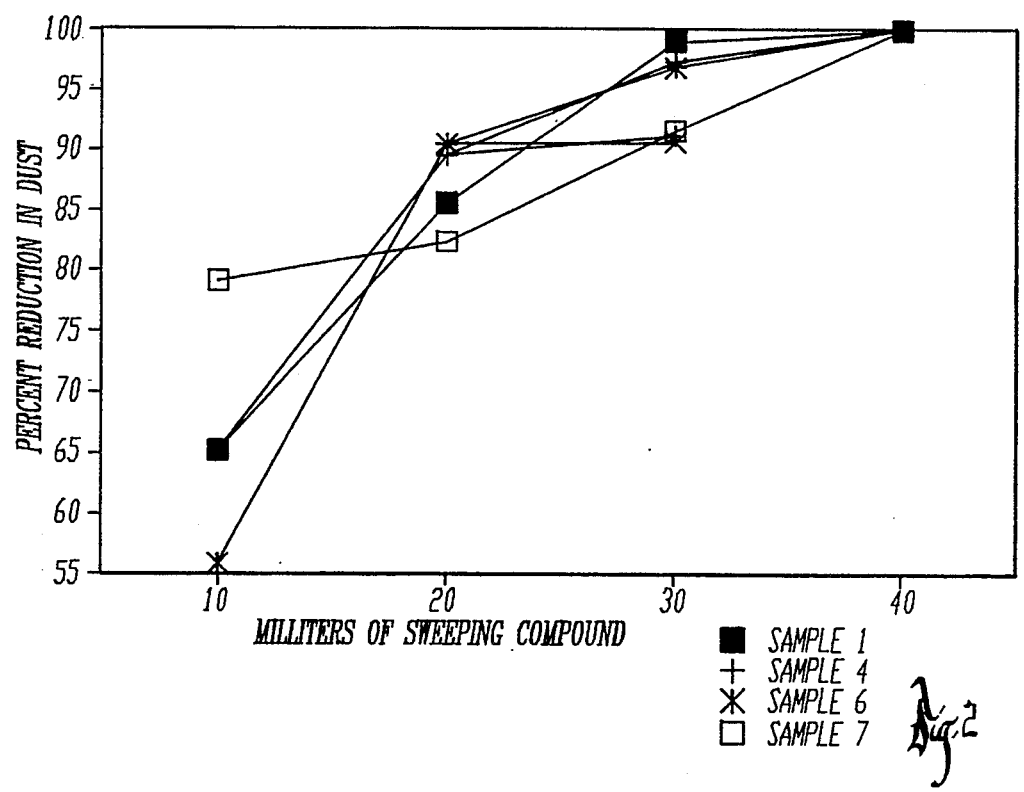

NON-OIL BASED SWEEPING COMPOUND

BACKGROUND OF THE INVENTION

This invention relates to compositions of a type used as floor sweeping compounds. Floor sweeping compounds are of course age-old. The idea is that use of the composition will aid in effectively sweeping and also cleaning the floor. Dust control is a common problem for floor sweeping. In the past, the most effective dust control agent has been oil. Hydrocarbon oil, in an appropriate percentage, is simply added to the carrier composition, thus enhancing the pick up of dust.

As it has developed in the art over the years, conventional sweeping compounds include a mixture of a carrier, is a hydrocarbon oil product, and perhaps, other cleaning and disinfecting aids. The oil is usually bottoms residue obtainable from refineries.

Carriers such as sawdust, rice hulls, oat hulls, corncobs and sand have been used for years as a medium to which the oil product adheres. The sand, when used, functions as both a carrier and abrading cleaner, and a weighting compound to assure that the sweeping composition will "hug" the floor. Variable proportions of sand are used, depending upon the age and the composition of the floor being cleaned. For example, with newly finished floors, sand in the composition is usually eliminated. However, as the floor gets older and abraded, sand is used to make sure that the composition effectively hugs the floor and causes slight abrasion to enhance cleaning.

In known sweeping compounds, the oil product fraction functions as a non evaporating moistening agent to control dust. Unfortunately oil in the sweeping compounds not only enhances dust removal, but also has the ability to damage certain flooring materials or at least the finish of some flooring materials. Further, oil is expensive. Oil also offers the additional disadvantage in that oil saturated sweeping compound becomes an environmental pollutant, disposal of which may often be difficult. As a result, there is a continuing need for development of effective sweeping compositions which avoid the inherent problems of an oil additive, or at least reduce the oil content, but at the same time, will still provide the effective dust control normally associated with oil use.

In the past, attempts to provide additives to floor sweeping compositions which will allow effective dust control and not tarnish, damage, or otherwise harm a natural floor surface have been explored. In this regard, many additives have been used from time to time in lieu of oil. Thus, deliquescence compounds have been added from time to time. Those include both organic compounds such as solid salts that are hygroscopics, such as calcium and magnesium chlorides, see for example Punch, U.S. Pat. No. 944,276; Singer, U.S. Pat. No. 827,887; and Burland, Great Britain Patent No. 17,246.

Each of these references describe carrier compositions that contain sawdust as the major carrier with the addition of hygroscopic materials. Singer describes the addition of dried, granulated, comminuted, or pulverized hygroscopic absorbent. Punch describes fine sawdust, water, calcium chloride, sodium chloride, or common salt, preferably pulverized rosin and an oily substance such as a paraffin oil. Burland describes sawdust mixed with either dry, granulated, or a saturated concentrated solution of hygroscopic salts, and in the case where it is a solution, using a sufficient quantity of the salt to make the mixture damp, but not wet.

In sum, hygroscopic salts have been used in the past, for the most part in dry, granulated form, and in some occasions, at a sufficient moisture level to make the mixture damp but not wet. Nevertheless, none of these prior compositions have been as effective as oil for a variety of reasons.

In the first instance, effective sweeping compositions which are to be sold commercially, must be packaged and capable of stability over a wide range of temperatures, ranging form well below zero up to as much as 100° F. Especially, being stable at low temperature is a problem. Put another way, the more water, the more likely the composition will freeze. The more concentrated the solution the greater the probability the solution will fall out at low temperatures. Freezing and thawing is, of course, unacceptable as it often causes some phase separation for the composition. The ideal composition is one which maintains a stable homogenous relationship under a wide range of conditions, and one which will effectively control dust, and also effectively enhance floor cleaning, all without harming the floor. Moreover, since the amount of sand in a composition will vary, as floor sweeping compositions are customized for either new or old floors, the customized for either new or old floors, the composition must be usable in the presence of a wide range of sand levels, depending upon whether there is no sand as for a new floor composition, or a high level of sand as for an old worn floor.

A primary object of the present invention is to provide an effective floor sweeping composition which does not use oil or incorporate oil at reduced levels as a dust control agent.

Another primary objective of the present invention is to provide a floor sweeping composition of enhanced sweeping capability and of highly effective dust control, which remains stable over a wide range of temperature conditions, from below freezing to as much as 100° F.

Another objective of the present invention is to provide a floor sweeping composition which can be conveniently packaged, shipped and stored, and which will remain stable during this entire time.

Another objective of the present invention is to provide a floor sweeping composition for effective dust control which provides maximum flexibility in that the dust control agent is effective where the floor composition ranges from no sand up to as much as 80% to 90% sand.

A yet further objective of the present invention is to provide a floor sweeping composition which has at least comparable dust control capability in comparison with oil, and which therefore, can be disposed of without environmental restrictions.

An even further objective of the present invention is to provide a floor sweeping composition can effectively control dust as well as oil does when it is used as a dust control agent.

Another objective of the present invention is to provide a floor sweeping composition that is less expensive to produce than those which use oil as a dust control agent.

A still further object of the present invention is to provide a floor sweeping composition that is safe to use with various flooring materials without damage to the floor or its finish.

Other objects, advantages and novel features of the present invention will become apparent from the following description of the invention.

SUMMARY OF THE INVENTION

A floor sweeping composition including a floor sweeping carrier and a liquid hygroscopic alkali or alkaline earth salt solution, preferably selected from the group of magnesium chloride and calcium chloride. The liquid enhances the effectiveness of the sweeping composition and its ability to collect and remove fine dust materials.

BRIEF DESCRIPTION OF THE DRAWINGS

FIG. 1 is a graph showing comparison data for the samples of Example 1, samples 1 through 5.

FIG. 2 is a graph showing comparison data and percent reduction in dust for runs of Example 1 showing comparisons of samples 1, 4, 6 and 7.

DETAILED DESCRIPTION OF THE INVENTION

As earlier indicated, the floor sweeping composition of the present invention uses a conventional solid carrier. That carrier can be any of those known in the art and generally is sawdust, rice hulls, oat hulls, and variable levels of sand. Both the sawdust and the sand can be sifted initially to provide aggregate particle size control. Particle size would approximate the following U.S. standard screen sieve mesh:

| Sand | Max % | Sawdust | Max % |
| --- | --- | --- | --- |
| Retained on #20 sieve, weight based on total sand content | 1% | Retained on #8 sieve, weight based on total sawdust content | 1% |
| | | Passing through #40 sieve, weight based on total sawdust content | 40% |

Sand level is variable. For new floors, usually no sand will be used, and for older floors, up to as much as 80% or 90% sand will be used.

It is to be emphasized that the hygroscopic alkali or alkaline earth salt used in this invention is a liquid hygroscopic salt solution. Simply adding of dry, pulverized hygroscopic salt such as magnesium chloride or calcium chloride will not work. This has been found to lack effectiveness for a variety of reasons. The most important of which is that dry granulated calcium chloride or magnesium chloride negatively impacts upon the floor sweeping effectiveness of the composition. Moreover, while it is true that the dry pulverized form is hygroscopic, it is not as effective as even plain water in dust collection when mixed with the solid carrier composition. In addition, the addition of a saturated concentrated solution of hygroscopic salts will not work. This has been found to lack effectiveness for storage and shipping. Saturated concentrated solutions of hygroscopic salts of calcium chloride and magnesium chloride have limited stability in various temperature ranges.

It has been discovered that for purposes of this invention, the most effective dust agent for the purpose of laying, collecting, or absorbing the dust and other like particles, is a liquid hygroscopic solution, an alkali or alkaline earth salt, preferably calcium chloride or magnesium chloride at a solution concentration ranging from about 10% by weight of the hygroscopic salt to about 35% by weight of the hygroscopic salt. The most preferred hygroscopic salt solution is a calcium chloride solution. The preferred solution concentration range is from 15% to about 35% solution of the hygroscopic salt and most preferably 29% with regard to the most preferred salt, that is calcium chloride solution. When a liquid hygroscopic solution of an alkaline earth salt, such as calcium chloride or magnesium chloride is used with a solution concentration within the range here expressed, the composition is stable over a wide range of temperatures varying from substantially below zero all the way up to 100° F. In particular, salt solution concentrations within those concentration ranges herein expressed, have salt freeze/thaw characteristics to provide stability from as low as −53° F. up to 100° F. At the same time they have the correct concentration characteristics such that the solution is highly hygroscopic and also coacts with the solid carrier so that it is just as effective at dust collection as oil. In addition, because it is liquid, it actually enhances floor sweeping rather than sacrificing floor sweeping capability, as is the case with a dry pulverized salt.

In addition, hygroscopic liquid solutions of alkaline earth salts, such as magnesium chloride and calcium chloride, retain their effectiveness at dust collection in the presence of substantial amounts of sand. This is in contrast to oil which when mixed with high amounts of sand results in a substantial reduction in dust collecting ability, simply because much of the oil is used in its interaction with the sand. Put another way, the liquid solutions of alkaline earth salts do not interact with the sand as much as does the oil, instead leaving their hygroscopic characteristics for dust collection from the floor.

The weight ratio of the liquid hygroscopic alkali or alkaline earth salt to the floor sweeping composition will vary over a wide range depending upon the nature of the floor sweeping composition. Generally, the weight ratio of solid carrier composition to the liquid solution will be from about 1:.5 to about 4:1, most preferably from about 1:1 to 3:1 and best results are achieved with a weight ratio of 1:1.6, using a 29% calcium chloride solution.

The weight ratio of the liquid hygroscopic alkali or alkaline earth salt when incorporated with oil to be used in a floor sweeping composition will vary over a wide range depending upon the nature of the floor sweeping composition. Generally the weight ratio of the liquid hygroscopic solution to oil will be from 3:1 to 10:1, most preferably from about 2.5:1 to 8:1 and best results are achieved with a weight ratio 5.8:1, using a 29% calcium chloride solution. The mixing procedure would call for the addition of the calcium chloride solution to the carrier. After thorough mixing the oil is added to the mixture.

The following examples are illustrative of the practice of the present invention. They are intended to be illustrative and not limitations of the invention, since various embodiments can rarely be evolved or formulated and still provide the enhanced sweeping effectiveness.

Example 1

Seven samples of floor sweeping compositions were formulated using 29% calcium chloride solution, oil and sawdust. It is to be understood that other concentrations of calcium chloride liquid ranging from 10% to 35% could be readily substituted for the 29% liquor.

When mixing the samples containing both calcium chloride solution and oil, the calcium chloride solution is added first to the sawdust. The oil is added second. A salt water solution such as calcium chloride and oil will not mix. This action forces the oil to the outside of the solid carrier making the oil portion the first item to adsorb dust. When the oil portion is depleted in dust absorption the calcium chloride solution begins to absorb dust.

Sample #1 was mixed using 10 parts by weight of sawdust and 7.5 parts by weight of oil.

Sample #2 was mixed using 10 parts by weight of sawdust and 8.14 parts by weight of 29% calcium chloride liquor and 3.75 parts by weight of oil.

Sample #3 was mixed using 10 parts by weight of sawdust and 5/43 parts by weight of 29% calcium chloride liquor and 3.75 parts by weight of oil.

Sample #4 was mixed using 10 parts by weight of sawdust and 10.85 parts by weight of 29% calcium chloride liquor and 1.88 parts by weight of oil.

Sample #5 was mixed using 10 parts by weight of sawdust and 10.85 parts by weight of 29% calcium chloride liquor.

Sample #6 was mixed using 10 parts by weight of sawdust and 16.28 parts by weight of 29% calcium chloride liquor.

Sample #7 was mixed using 10 parts by weight of sawdust and 21.7 parts by weight of 29% calcium chloride liquor.

Example 2

The seven samples were tested for dust retention effectiveness by using powdered bentonite dust in air agitation in a closed vessel to maintain the dust in suspension. Sweeping compound was added to the bentonite dust mixture in the closed vessel until 100% of the dust was removed in a pre-weighed filter.

A measured amount of sweeping compound was added to the vessel and the dust and the sweeping compound was agitated with air. The dust was collected for ten seconds and the pre-weighed filter re-weighed. This testing process was carried out for seven different compounds at increments of 10 ml of sweeping compound from zero to 40 ml of addition. A blank sample with no sweeping compound was tested for each group of samples. Table I provides the data for each sample.

TABLE I

| | | Reduction in Dust |
|---|---|---|
| Sample #1 | | |
| Blank | 0.0044 | |
| 10 | 0.0015 | 65.91% |
| 20 | 0.0006 | 86.36% |
| 30 | 0.0 | 100.00% |
| 40 | 0.0 | 100.00% |
| Sample #2 | | |
| Blank | 0.0027 | |
| 10 | 0.0026 | 29.73% |
| 20 | 0.0017 | 54.05% |
| 30 | 0.0003 | 91.89% |
| 40 | 0.0 | 100.00% |
| Sample #3 | | |
| Blank | 0.0042 | |
| 10 | 0.0019 | 54.76% |
| 20 | 0.0010 | 76.19% |
| 30 | 0.0005 | 85.71% |
| 40 | 0.0 | 100.00% |
| Sample #4 | | |
| Blank | 0.0052 | |

TABLE I-continued

| | | Reduction in Dust |
|---|---|---|
| 10 | 0.0018 | 65.38% |
| 20 | 0.0005 | 90.38% |
| 30 | 0.0001 | 98.08% |
| 40 | 0.0 | 100.00% |
| Sample #5 | | |
| Blank | 0.0053 | |
| 10 | 0.0023 | 56.60% |
| 20 | 0.0011 | 79.24% |
| 30 | 0.0005 | 90.56% |
| 40 | 0.0 | 100.00% |
| Sample #6 | | |
| Blank | 0.0046 | |
| 10 | 0.0020 | 56.52% |
| 20 | 0.0004 | 91.30% |
| 30 | 0.0001 | 97.83% |
| 40 | 0.0 | 100.00% |
| Sample #7 | | |
| Blank | 0.0065 | |
| 10 | 0.0013 | 80.00% |
| 20 | 0.0011 | 83.08% |
| 30 | 0.0005 | 92.31% |
| 40 | 0.0 | 100.00% |

The collection time for the filter was measured as ten revolutions of the air circulating tube or ten seconds. The residue on the filter was weighed and the percent reduction of the dust was calculated. The dust collected as a blank is considered one hundred percent (100%) and the difference of the blank and the weighed filter is divided by the weight of the blank to determine the percent reduction.

$$\text{Percent Reduction} + 100 \times \frac{\text{Blank} - \text{Weighed}}{\text{Blank}}$$

Blank + Air and Dust with no Sweeping Compound or 100% Dust

The results are shown graphically in FIG. 1 and FIG. 2.

All samples achieved 100% dust suppression at the 40 ml level. At the 30 ml level all samples performed satisfactorily with the highest sample at 100% dust suppression and the lowest sample at 85% dust suppression. At the 20 ml level sample #6 containing no oil and sample #4 containing reduced levels of oil in combination with a calcium chloride solution performed better than straight oil. At the 10 ml level all samples could be judged as inadequate with the exception of sample #7 which contained no oil.

The data clearly demonstrates that at various use levels, a sweeping compound made with a calcium chloride solution and a sweeping compound made with a calcium chloride solution and reduced quantity of oil will perform as well or better than oil base compounds alone.

In addition, the compositions are more effective than oil in the presence of substantial amounts of sand. Finally, it can be seen that the composition can be subjected to temperatures lower than zero and up to 100° and still retain its phase stability.

It can be seen that the compositions of the present invention are equal to and in some cases more effective than oil, can be disposed of without providing any risk of oil contamination, and can be used to fully replace oil or greatly reduce the oil content as a component of floor sweeping compositions, and yet function as effectively as oil for wetting or moistening agent used to control dust.

We claim:

1. A floor sweeping composition having stable freeze/thaw characteristics from about −53° F. to about 100° F. consisting essentially of:
   a solid carrier composition for use in enhancing the effectiveness of floor sweeping; and
   a liquid hygroscopic alkali or alkaline earth salt solution having a concentration ranging from about 10% by weight of said solution to about 35% by weight of said solution mixed with said carrier composition.

2. The floor sweeping composition of claim 1 combined with some oil to reduce oil levels of sweeping compound in sweeping compositions.

3. The floor sweeping composition of claim 1 or 2 wherein said solid carrier is selected from the group consisting of sawdust, rice hulls, oat hulls and sand.

4. The floor sweeping composition of claim 1 wherein the salt composition is an alkaline earth salt.

5. The salt composition of claim 4 wherein the alkaline earth salt is selected from the group consisting of calcium chloride and magnesium chloride.

6. The floor sweeping composition of claim 5 wherein the salt is calcium chloride salt solution.

7. The floor sweeping composition of claim 6 wherein the concentration of calcium chloride salt solution is from about 15% to 35%.

8. The floor sweeping composition of claim 7 wherein the composition is about 29% calcium chloride salt solution.

9. The floor sweeping compositions of claim 1, or claim 7, or claim 8, combined with various levels of oil.

10. The floor sweeping compositions of claim 9 wherein the weight ratio of solid carrier and liquid hygroscopic solution to oil is about 2.6:1.9.

11. The floor sweeping composition of claim 1 wherein the weight ratio of solid carrier to liquid hygroscopic solution is from about 1:.5 to 1:3.

12. The floor sweeping composition of claim 11 wherein the weight ratio of solid carrier to liquid hygroscopic solution is from about 1:1 to 1:2.2.

13. The floor sweeping composition of claim 12 wherein the weight ratio of solid carrier to liquid hygroscopic solution is about 1:1.6.

* * * * *